(12) United States Patent
Portmann

(10) Patent No.: US 7,229,180 B2
(45) Date of Patent: Jun. 12, 2007

(54) REFLECTOR DEVICE FOR USE IN PHOTOGRAPHY

(75) Inventor: Francois Portmann, Huningue (FR)

(73) Assignee: Bron Elektronik AG, Allschwil (CH)

( * ) Notice: Subject to any disclaimer, the term of this patent is extended or adjusted under 35 U.S.C. 154(b) by 82 days.

(21) Appl. No.: 11/048,088

(22) Filed: Feb. 1, 2005

(65) Prior Publication Data

US 2005/0169617 A1 Aug. 4, 2005

(30) Foreign Application Priority Data

Feb. 2, 2004 (DE) ................ 20 2004 001 528 U

(51) Int. Cl.
*G03B 15/02* (2006.01)
(52) U.S. Cl. ............................ 362/16; 362/3; 362/17; 362/18; 362/102
(58) Field of Classification Search ............ 362/16–18, 362/102, 352, 3, 310, 355, 431, 450, 319, 362/277, 278; 135/20.3, 28, 31, 32, 98
See application file for complete search history.

(56) References Cited

U.S. PATENT DOCUMENTS 3,926,202 A * 12/1975 Uthemann et al. ......... 135/20.3
4,757,425 A * 7/1988 Waltz .......................... 362/18

FOREIGN PATENT DOCUMENTS

DE 203 02 792 U1 5/2003
EP 0 806 606 A1 11/1997

* cited by examiner

*Primary Examiner*—Sandra O'Shea
*Assistant Examiner*—Mark Tsidulko
(74) *Attorney, Agent, or Firm*—Thompson & Knight LLP; James J. Murphy

(57) ABSTRACT

Reflector device (10) for use in photography having an openable reflector screen (11) and a screen handle (12), at one end of which handle screen spokes (13) are hinge-mounted, and along which there is mounted so as to be displaceable back and forth a slider member (14), there being hinge-mounted on the slider member (14) bracing spokes (15), the opposite ends of which are joined in articulated manner to the screen spokes (13), the slider member (14) being displaceable back and forth along the screen handle (12) by means of a rope drive (19 or 26).

8 Claims, 3 Drawing Sheets

REFLECTOR DEVICE FOR USE IN PHOTOGRAPHY

FIELD OF INVENTION

The present invention relates to a reflector device for use in photography.

BACKGROUND OF INVENTION

Photographic reflector devices are generally known, for example, from EP 0 806 606 B1, in which the support for an illuminating element simultaneously forms the screen handle of the reflector screen. This screen handle, acting as a support, is in its entirety displaceable and arrestable inside a bearing member on which the screen spokes are hinge-mounted. In the case of relatively large screens, that form of construction is extremely unwieldy and in addition is also demanding in terms of expenditure of force. If the screen handle is adjusted from the open side of the reflector screen, a second person is required to hold the stay to which the reflector screen is attached; otherwise there would be a risk that the whole device would fall to the ground The problem underlying the present invention is accordingly so to construct a reflector device of the kind mentioned that the screen can comfortably be opened and collapsed again by one person, and in fact irrespective of the size of the screen or of the reflector device. It should especially be possible for the screen to be opened and collapsed again without appreciable expenditure of force.

SUMMARY OF INVENTION

The core of the present invention accordingly resides in the fact that the slider member, on which the bracing spokes are hinge-mounted, is movable back and forth along the screen handle by means of a rope drive. In order to open the screen as well as to collapse it, all that is therefore required is for the said rope drive to be operated. This can be effected by means of a separate drive, either an electromotive drive or a handcrank drive. The drive is arranged either inside or outside the screen, depending on the size and the form of construction of the reflector device.

Preferably, the rope drive comprises a continuous rope or continuous belt to which the slider member is attached. It is, however, also possible to provide a one-way rope instead of a continuous rope, but in that case it is advantageous to move the slider member against the action of a resilient element, for example a telescopic spring element or a band of rubber, into the screen-opening position, so that collapse of the screen is then effected automatically by that resilient element. When the rope drive is released, the resilient element thus serves to push the slider member back again into the starting position in which the screen is in the collapsed state.

The direction of the continuous rope is preferably changed, on the one hand, in the region of the articulation of the screen spokes at the screen handle and, on the other hand, at a position remote therefrom on the screen handle. Guide bolts, guide rollers or guide pulleys serve to change the direction of the rope.

An especially elegant solution is distinguished by the screen handle being of tubular construction and by one leg of the continuous rope extending inside the tubular screen handle.

As has already been mentioned in the context of the prior art, the screen handle acts as a support for an illuminating element that is displaceable along the screen handle so that an optimum focal position can be set.

BRIEF DESCRIPTION OF DRAWINGS

Three embodiments of a reflector device constructed in accordance with the invention are described herein below with reference to the accompanying drawings in which.

DETAILED DESCRIPTION OF THE INVENTION

Figure 1:
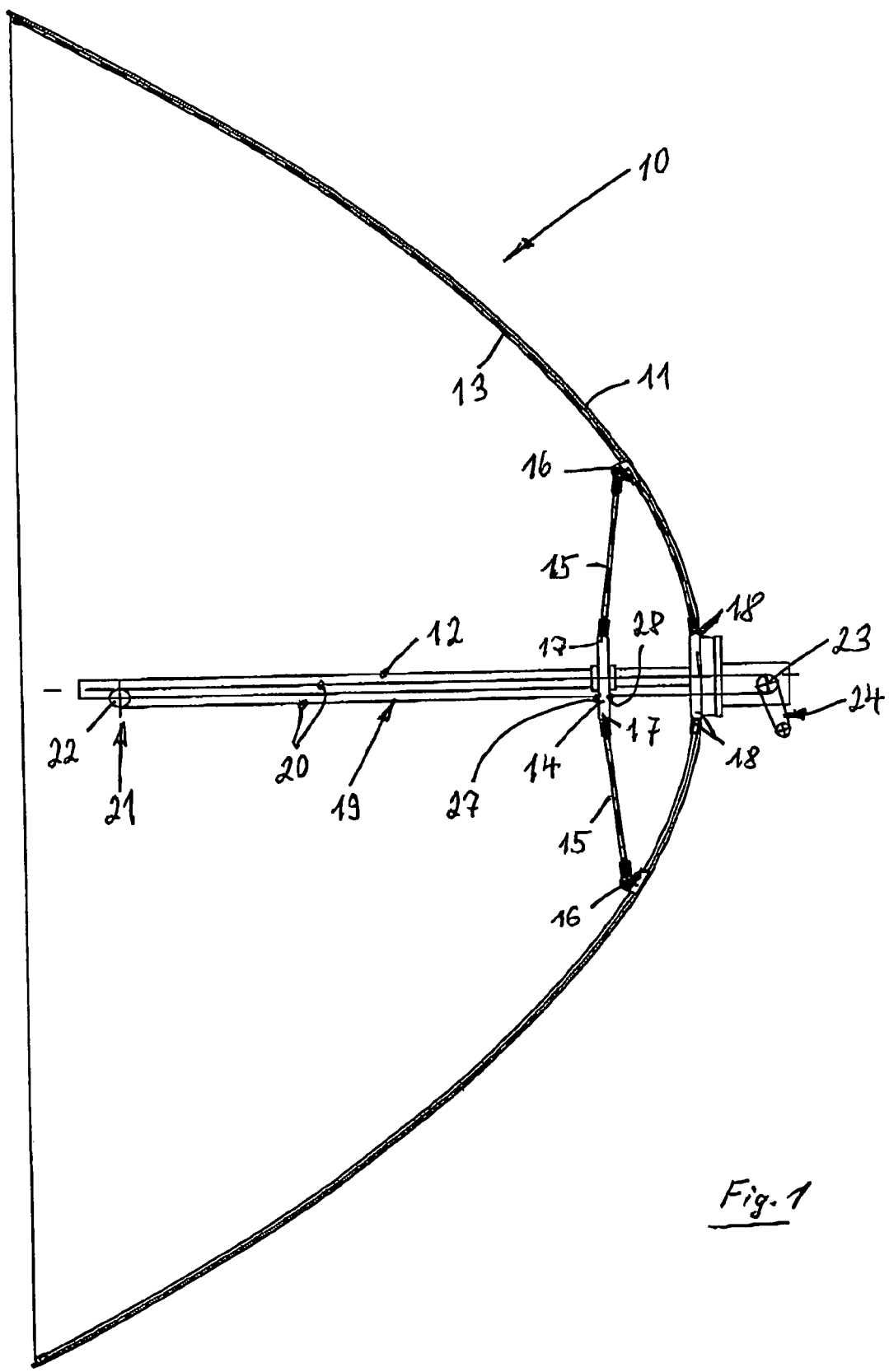
FIG. 1 is a diagrammatic longitudinal section of a first embodiment of a reflector device according to the invention.

FIG. 1 shows—as stated—a first embodiment of a reflector device 10 for use in photography, filming or the like, having an openable reflector screen 11 and a screen handle 12, at one end of which handle, that is to say the right-hand end in FIG. 1, screen spokes 13 are hinge-mounted. The corresponding points of articulation are indicated by the reference numeral 18. A slider member 14 is mounted so as to be displaceable back and forth along the screen handle 12. The slider member 14 is an annular element around the outer circumference of which there are hinge-mounted, in uniform distribution, bracing spokes 15, the opposite ends of which are joined in articulated manner to the screen spokes 13. The hinge joints between bracing spokes 15 and slider member 14 are indicated by the reference numeral 17. The hinge joints between the screen spokes 13 and the bracing spokes 15 are indicated by the reference numeral 16.

The slider member 14 is displaceable back and forth along the screen handle 12 by means of a rope drive 19, the rope drive 14 in the embodiment according to FIG. 1 comprising a continuous rope 20 to which the slider member 14 is attached. In FIG. 1 the rope connections are indicated by the reference numerals 27 and 28.

The direction of the continuous rope 20 is changed, on the one hand, in the region of the articulation 18 of the screen spokes 13 at the screen handle and, in fact, outside the reflector screen 11, and, on the other hand, at a position 21 remote therefrom, that is at the free end of the screen handle 12. Guide pulleys 22, 23 are used for the change in direction. In the embodiment according to FIG. 1, associated with the guide pulley 23, which is arranged outside the reflector screen, is a crank drive 24, by means of which the continuous rope 20 is movable in one or the other direction and takes along the slider member 14 correspondingly, opening or collapsing the reflector screen 11 accordingly.

Figure 2:
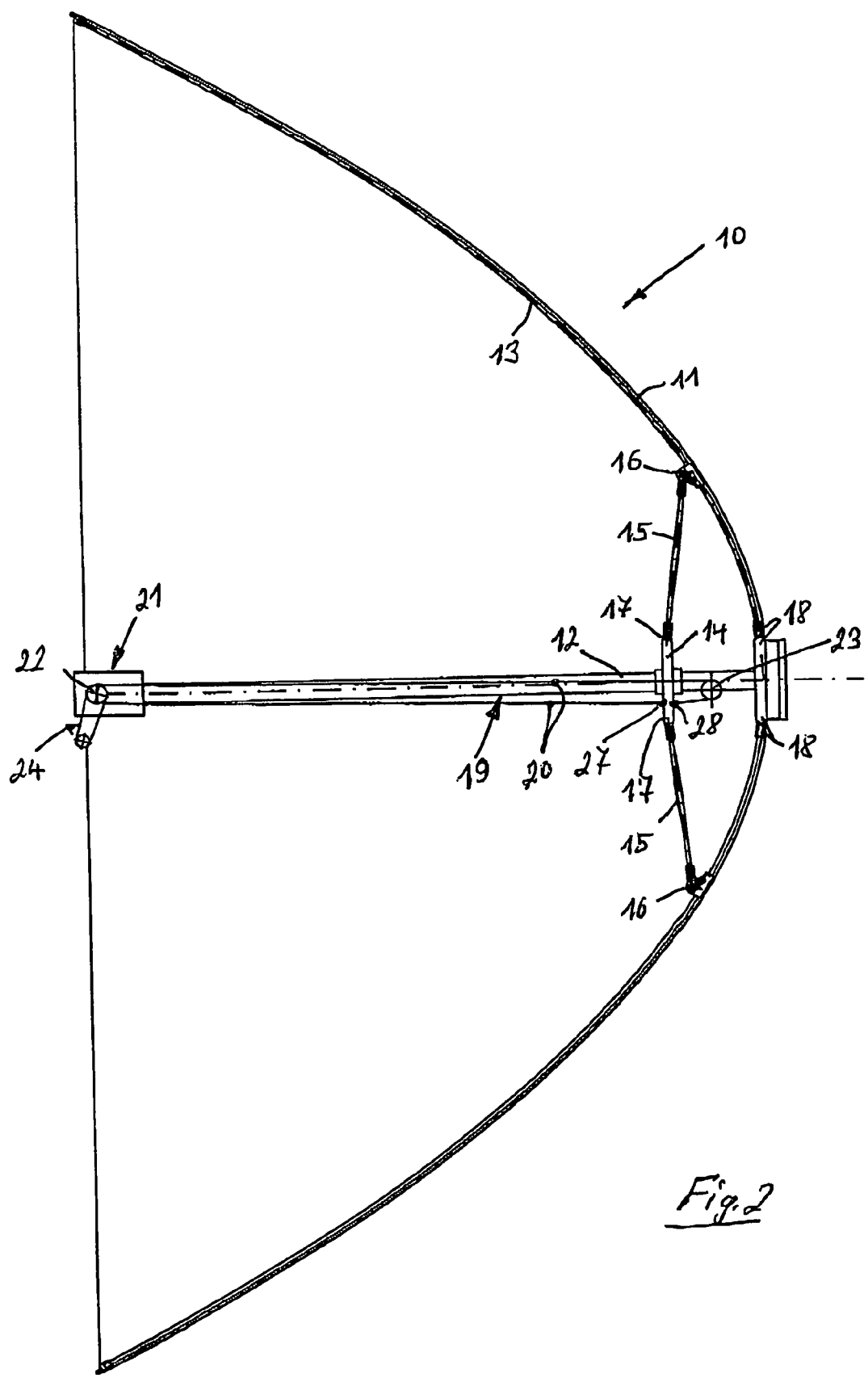
FIG. 2 is a second embodiment of a reflector device corresponding to FIG. 1.

The embodiment according to FIG. 2 differs from that according to FIG. 1 only in respect of the crank drive 24 being associated with the opposite guide pulley 22. The embodiments according to FIGS. 1 and 2 are otherwise of the same construction.

Figure 3:
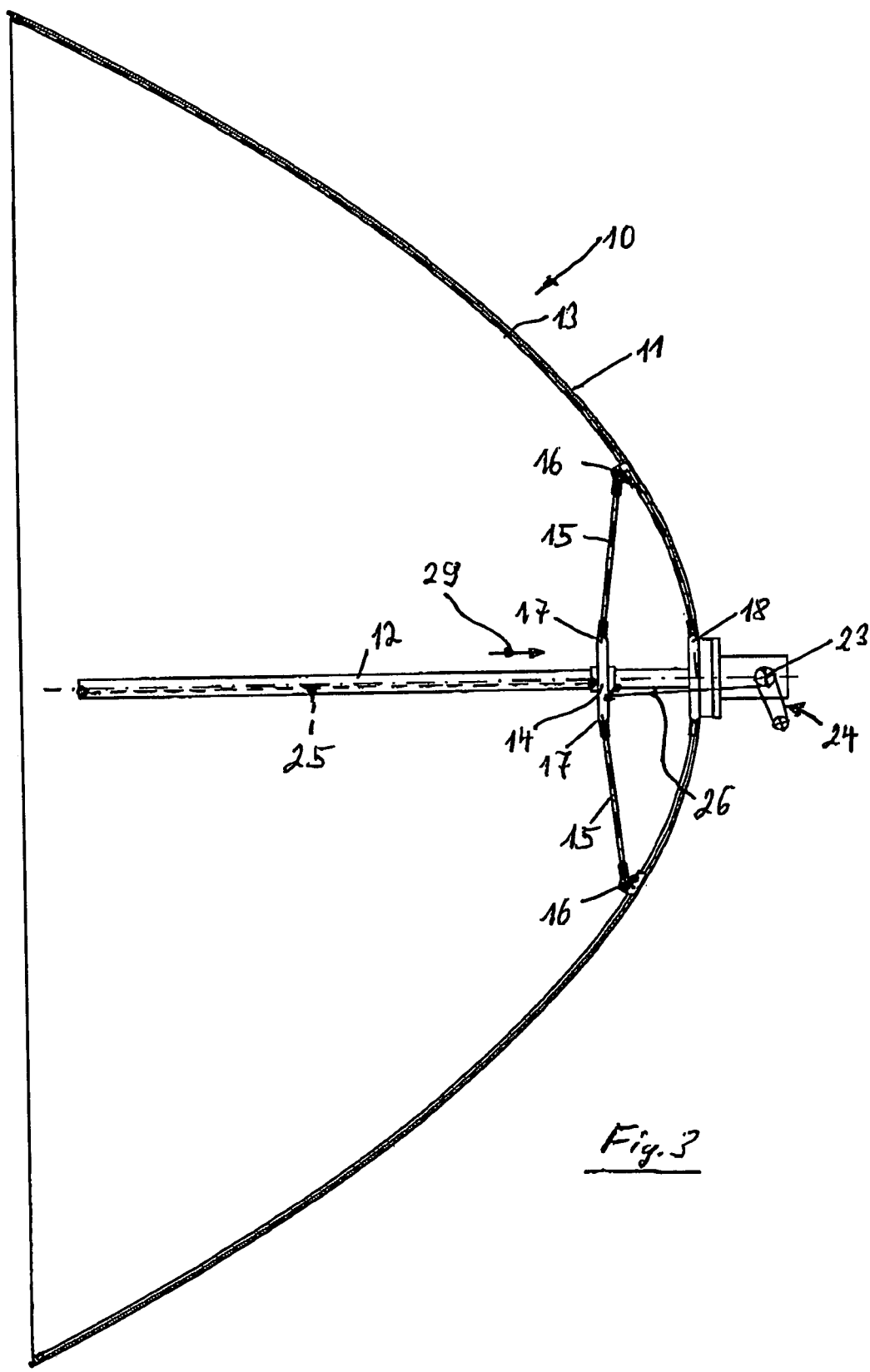
FIG. 3 is a diagrammatic longitudinal section of a third embodiment of a reflector device according to the invention.

The embodiment according to FIG. 3 differs from the above two embodiments in the respect that the rope drive 26 is not a continuous rope but is of one-way construction, one end of the rope being attached to the slider member 14 and the other end of the rope being attached around a guide pulley 23 which is connected to a crank drive 24. In the embodiment according to FIG. 3, the guide pulley 23 in question is again outside the reflector screen 11. The slider member 14 is displaced against the action of a resilient element which is not shown in detail here, for example a telescopic spring or a band of rubber 25 or the like, into the screen-opening position (arrow 29). When the crank drive 24 is released, the resilient element, for example the band of rubber 25, pulls the slider member 14 in a direction opposite to the arrow 29 back into the starting position, in which the reflector screen 11 is in the collapsed state.

As has already been mentioned at the outset, there is positioned on the screen handle 12 preferably at least one illuminating element, to be specific in such a manner that it is displaceable along the screen handle 12 relative to the reflector screen.

The resilient element 25 mentioned with reference to FIG. 3 is preferably so formed that the restoring force thereof is of approximately the same magnitude over the whole of the displacement path of the slider member 14 along the screen handle 12. To that end, the resilient element may preferably be formed as a telescopic spring or multi-step spring element Regarding the embodiment according to FIG. 3, it may in addition be mentioned that the slider member 14 can alternatively also be resiliently prebiased into the screen-opening position. Collapsing of the screen then takes place against the action of the said resilient element; that is to say the slider member 14 is displaced against the action of the resilient element into the position in which the screen is in the collapsed state in order then to be arrested in that position. The movement of the slider member is effected likewise preferably by the mentioned crank drive. After releasing the arresting action, the slider member automatically moves into the screen-opening position under the action of the resilient element.

All of the features disclosed in the application documents are claimed as being important to the invention insofar as they are novel, individually or in combination, compared with the prior art.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A reflector device for use in photography, said reflector device comprising:
    an openable reflector screen, said reflector screen having an inner surface for reflecting light in a selected direction and an opposing outer surface spaced from the inner surface by a body of the reflector screen,
    a screen handle connected to said reflector screen,
    screen spokes hinge-mounted at one end of said handle,
    a slider member mounted so as to be displaceable back and forth along said slider member,
    bracing spokes hinge-mounted on the slider member, the opposite ends of said bracing spokes being joined in articulated manner to said screen spokes, and
    a rope drive operative to displace said slider member back and forth along said screen handle, wherein said rope drive includes a crank drive that is disposed adjacent said outer surface of said reflector screen to eliminate shadowing by said crank drive when light is reflected by said inner surface.

2. A reflector device according to claim 1, wherein said rope drive comprises a continuous belt or continuous rope to which said slider member is attached.

3. A reflector device according to claim 2, wherein the direction of said continuous belt or rope is changed, on the one hand, in the region of the articulation of the screen spokes at the screen handle and, on the other hand, at a position remote therefrom on the screen handle.

4. A reflector device according to claim 3, wherein elements selected from the group consisting of guide bolts, guide rollers and guide pulleys are operatively arranged to effect said change in direction of said rope.

5. A reflector device according to claim 3, wherein a drive selected from the group consisting of a motor drive and a manual drive, and a crank manual drive, is associated with one of the two rope guides.

6. A reflector device according to claim 1, wherein said screen handle is of tubular construction, said rope is a continuous length of rope, and one leg of said continuous rope extends inside the tubular screen handle.

7. A reflector device according to claim 1, wherein said rope defines a one-way rope drive, and the slider member is displaceable by that drive against the action of an element selected from the group consisting of a resilient element, a telescopic spring resilient element, a band of resilient material, and a band of resilient rubber, into the screen-opening position, and vice versa.

8. A reflector device according to claim 1, wherein said screen handle is adapted to slidably support at least one illuminating element which is displaceable along said screen handle relative to said reflector screen.

* * * * *